(12) United States Patent
Williams et al.

(10) Patent No.: US 11,461,104 B2
(45) Date of Patent: Oct. 4, 2022

(54) DEFERRED SYSTEM ERROR EXCEPTION HANDLING IN A DATA PROCESSING APPARATUS

(71) Applicant: ARM LIMITED, Cambridge (GB)

(72) Inventors: Michael John Williams, Cambridge (GB); Richard Roy Grisenthwaite, Cambridge (GB); Simon John Craske, Cambridge (GB)

(73) Assignee: ARM LIMITED, Cambridge (GB)

( * ) Notice: Subject to any disclaimer, the term of this patent is extended or adjusted under 35 U.S.C. 154(b) by 217 days.

(21) Appl. No.: 14/952,807

(22) Filed: Nov. 25, 2015

(65) Prior Publication Data

US 2016/0154654 A1 Jun. 2, 2016

(30) Foreign Application Priority Data

Nov. 28, 2014 (GB) ...................................... 1421134

(51) Int. Cl.
 *G06F 9/38* (2018.01)
 *G06F 9/52* (2006.01)
 *G06F 11/07* (2006.01)

(52) U.S. Cl.
 CPC ............ *G06F 9/3861* (2013.01); *G06F 9/522* (2013.01); *G06F 11/0721* (2013.01); *G06F 11/0793* (2013.01)

(58) Field of Classification Search
 CPC .... G06F 9/3861; G06F 9/522; G06F 11/0721; G06F 11/0793
 USPC ........................................................ 712/244
 See application file for complete search history.

(56) References Cited

U.S. PATENT DOCUMENTS

| 5,438,677 A | 8/1995 | Adams et al. |
| 5,454,091 A | 9/1995 | Sites et al. |
| 5,887,175 A * | 3/1999 | Col ...................... G06F 9/4812 |
| | | 710/260 |
| 6,173,248 B1 | 1/2001 | Brauch |

(Continued)

FOREIGN PATENT DOCUMENTS

| CN | 1115443 A | 1/1996 |
| CN | 1242546 A | 1/2000 |
| TW | 200839513 A | 10/2008 |

(Continued)

OTHER PUBLICATIONS

International Search Report and Written Opinion of the International Searching Authority dated Jan. 25, 2016 issued in PCT/GB2015/053135, 14 pages.

(Continued)

*Primary Examiner* — Shawn Doman
(74) *Attorney, Agent, or Firm* — Nixon & Vanderhye, PC

(57) ABSTRACT

Apparatus for data processing and a method of data processing are provided. Data processing operations are performed in response to data processing instructions. An error exception condition is set if a data processing operation has not been successful. It is determined if an error memory barrier condition exists and an error memory barrier procedure is performed in dependence on whether the error memory barrier condition exists. The error memory barrier procedure comprises, if the error exception condition is set and if an error mask condition is set: setting a deferred error exception condition and clearing the error exception condition.

20 Claims, 11 Drawing Sheets

(56) References Cited

U.S. PATENT DOCUMENTS

2011/0231633 A1* 9/2011 Grisenthwaite ....... G06F 9/3001
712/208
2012/0198278 A1 8/2012 Williams et al.

FOREIGN PATENT DOCUMENTS

| TW | 201439906 A | 10/2014 |
|---|---|---|
| WO | WO 2004/023288 | 3/2004 |
| WO | 2011/114125 | 9/2011 |

OTHER PUBLICATIONS

ARM Limited, "ARM Cortex™-M Programming Guide to Memory Barrier Instructions" Application Note 321, Sep. 17, 2012, pp. 1-52.
Search Report for GB1421134.6 dated May 27, 2015, three pages.
ARM Cortex™-M Programming Guide to Memory Barrier Instructions; Application Note 321; released on Sep. 17, 2012; pp. 1-52.
Taiwanese Office Action 104139235 dated Oct. 31, 2019.
Office Action in a related Taiwan Application No. 104139235 dated Oct. 28, 2020, 3 pages.
European Patent Office Communication in application No. 15794224.4 dated Mar. 2, 2022, 6 pages.
English Translation of Korean Office Action in corresponding KR Application No. 10-2017-7016744 dated Jan. 27, 2022, 91 pages.
English Translation of Chinese Office Action in corresponding CN Application No. 201580063372.1 dated Apr. 13, 2021, 8 pages.
Examination Report in corresponding Indian Application No. 201717018600 dated Dec. 24, 2020.
Chinese Office in corresponding CN Application No. 2015800633721 dated Januaty 4, 2021.
Office Action in Taiwanese Application No. 104139235 dated Jun. 23, 2020 with English translation.
Office Action in corresponding European Application No. 15 794 224.4-1218 dated Feb. 16, 2021.
Office Action in Chinese Patent Appln. No. 201580063372.1 dated Sep. 2, 2020, pp. 25.
Chinese Office Action No. 201580063372.1 dated Mar. 3, 2020 (12 pages).
Office Action in a Great Britain Application GB1421134.6 dated Oct. 21, 2020, 3 pages.

* cited by examiner

PHYSICAL:

|  | EL1 | EL2 | EL3 |
|---|---|---|---|
| EL3 | P | P | M |
| EL2 | P | M | T |
| EL1 | M | T | T |
| EL0 | M | T | T |

Rows = CURRENT, Columns = TARGET

P = PENDED, I.E. ALWAYS MASKED

M = PENDED IF PSTATE.A==1, TAKEN OTHERWISE

T = TAKEN, I.E. UNMASKED

FIG. 9A

VIRTUAL:

|  | EL1 |
|---|---|
| EL3 | P |
| EL2 | P |
| EL1 | M |
| EL0 | M |

Rows = CURRENT, Column = TARGET

FIG. 9B

| AMO | VSE | PHYSICAL TARGET | VIRTUAL TARGET | VIRTUAL PENDING? |
|---|---|---|---|---|
| 0 | X(SBZ) | EL1 | N/A | NO |
| 1 | 0 | EL2 | (EL1) | NO |
| 1 | 1 | EL2 | (EL1) | YES |

FIG. 9C

```
ErrorMemoryBarrier(MBReqDomain_FullSystem, MBReqTypes_All);

route_to_el3 = HaveEL(EL3) && SCR_EL3.EA == '1';
route_to_el2 = (HaveEL(EL2) && !IsSecure() && PSTATE.EL != EL2 &&
                (HCR_EL2.TGE == '1' || HCR_EL2.AMO == '1'));
target = (if route_to_el3 then EL3 elsif route_to_el2 then EL2 else EL1);

// If targeting EL1 then mask is active at EL0 and EL1, otherwise only at the
target EL mask_active = if target == EL1 then PSTATE.EL IN {EL0,EL1} else PSTATE.EL ==
target;

if PhysicalErrorPending() then                // ISR_EL1.A is set to 1 masked = (mask_active && PSTATE.A == '1');
    if masked then

DISR_EL1.A = '1';

ClearPendingPhysicalError();          // Set ISR_EL1.A to 0 if route_to_el2 && HCR_EL2.VSE == '1' then    // Virtual SError pending
    if PSTATE.A == '1' then
        VDISR_EL2.A = '1';
        HCR_EL2.VSE = '0';                    // Clear pending virtual SError // If either a physical SError interrupt or virtual SError interrupt is now
pending, it is taken before the next instruction. The prioritization of these
checks is not specified by the architecture, so these tests can occur in either
order.

if PhysicalErrorPending() then
    unmasked = (mask_active && PSTATE.A == '0');
    if (!mask_active && UInt(target) > UInt(PSTATE.EL)) || unmasked then
        TakePhysicalSystemErrorException();
elsif route_to_el2 && HCR_EL2.VSE == '1' then
    if PSTATE.A == '0' then
        TakeVirtualSystemErrorException();
```

FIG. 10A

```
Vector:     EMB
            SUB     SP,SP,#34*8
            STP     X0,X1,[SP]
            STP     X2,X3,[SP,#2*8]
            ...
            STP     X28,X29,[SP,#28*8]
            MRS     X21,SP_EL0
            MRS     X22,ELR_EL1
            MRS     X23,SPSR_EL1
            STP     X30,X21,[SP,#30*8]
            STP     X22,X23,[SP,#32*8]
            ...
            MRS     X21,DISR_EL1
            TBNZ    X21,#8,Error_Handler
```

FIG. 10B

DEFERRED SYSTEM ERROR EXCEPTION HANDLING IN A DATA PROCESSING APPARATUS

This application claims priority to GB Patent Application No. 1421134.6 filed 28 Nov. 2014, the entire content of which is hereby incorporated by reference.

TECHNICAL FIELD

The present disclosure relates to data processing. More particularly, it relates to handling system errors in a data processing apparatus.

BACKGROUND

It is known that when a data processing apparatus is performing data processing operations in response to the data processing instructions which it executes that some data processing operations attempted by the data processing apparatus may result in a system error. Such a system error may result for a variety of reasons, but generally indicates that the data processing apparatus has been unable to successfully complete the data processing operation. In order to handle the occurrence of such system errors, it is further known that the data processing apparatus can be configured to carry out an exception handling routine, this being a set of data processing instructions which have been provided by the programmer in order to handle the occurrence of the system error in a reliable and consistent manner. The present disclosure relates to improvements in the manner in which a data processing apparatus responds to the occurrence of a system error.

SUMMARY

Viewed from a first aspect, there is provided an apparatus for data processing comprising: processing circuitry to perform data processing operations in response to data processing instructions, to determine if an error memory barrier condition exists and to perform an error memory barrier procedure in dependence on whether the error memory barrier condition exists, wherein the processing circuitry is capable of setting an error exception condition upon detection that a data processing operation has not been successful, and wherein the error memory barrier procedure comprises, if the error exception condition is set and if an error mask condition is set: setting a deferred error exception condition; and clearing the error exception condition.

Viewed from a second aspect, there is provided a method of data processing comprising the steps of: performing data processing operations in response to data processing instructions; setting an error exception condition upon detection that a data processing operation has not been successful; determining if an error memory barrier condition exists; and performing an error memory barrier procedure in dependence on Whether the error memory barrier condition exists, wherein the error memory barrier procedure comprises, if the error exception condition is set and if an error mask condition is set: setting a deferred error exception condition; and clearing the error exception condition.

Viewed from a third aspect, there is provided an apparatus for data processing comprising: means for performing data processing operations in response to data processing instructions; means for setting an error exception condition upon detection that a data processing operation has not been successful; means for determining if an error memory barrier condition exists; and means for performing an error memory barrier procedure in dependence on whether the error memory barrier condition exists, wherein the error memory barrier procedure comprises, if the error exception condition is set and if an error mask condition is set: setting a deferred error exception condition; and clearing the error exception condition.

BRIEF DESCRIPTION OF THE DRAWINGS

The present invention will be described further, by way of example only, with reference to embodiments thereof as illustrated in the accompanying drawings, which:

FIG. 9A illustrates an example set of current and target exception levels used to handle physical errors, together with definitions of how the corresponding error exception condition is handled, in one embodiment;

FIG. 9B illustrates an example set of current exception levels and the target exception level used to handle virtual errors, together with definitions of how the corresponding error exception condition is handled in one embodiment;

FIG. 9C illustrates a table of physical and virtual targets used in dependence on the setting of two parameters in an embodiment running in a virtualized operating environment;

FIG. 10A illustrates an example set of pseudocode defining an error memory barrier instruction in one embodiment; and FIG. 10B illustrates an example sequence of data processing instructions using an error memory barrier instruction.

DESCRIPTION OF EMBODIMENTS

Figure 1:
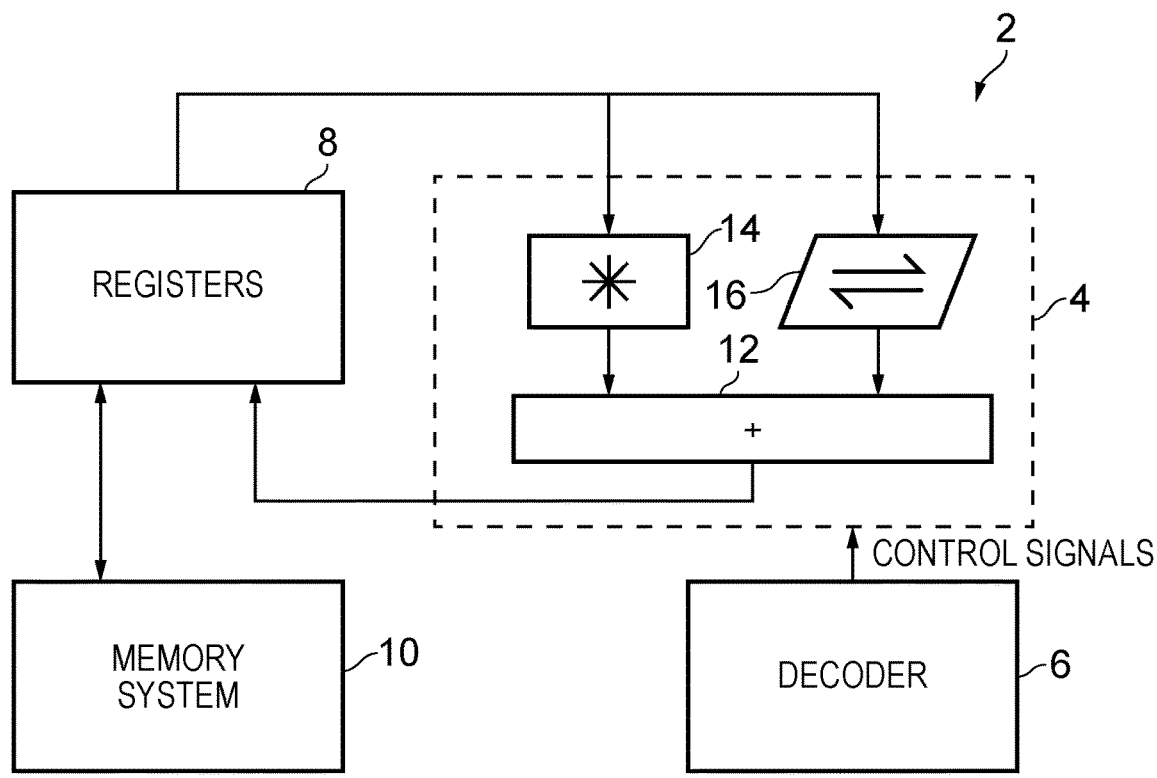
FIG. 1 schematically illustrates an example of data processing circuitry and an associated memory system in one embodiment.

The present techniques recognise that in an apparatus for processing data which responds to a system error (asynchronous abort) by performing an exception handling procedure (routine), difficulties may arise for the system to identify the source of such an error when it is reported. This is related to the asynchronous nature of these errors meaning that there may be little correlation between the point at which the data processing instruction which resulted in this system error occurring was executed and the point at which the error is reported back to the processor (processing circuitry). This may for example, in particular, be the case with regard to memory accesses which the processing circuitry seeks to perform in response to corresponding data processing instructions, given the latency which may be associated with such memory accesses and the potential for them to be unsuccessful in various ways. Such errors may be generated, for example, by load operations, store operations, page table walks, instruction fetches and so on. In particular, the present techniques recognise that when a system error (which may result from an unsuccessful memory access, or may have another source) is reported to the processing circuitry whilst it is already performing an exception handling procedure triggered by a previous exception (such as an interrupt request), it is beneficial for the system to be able to identify the source of the system error which it must now handle, such that, for example, appropriate remedial action may be taken. Note that the error exception condition may therefore be set in response to different events in the apparatus. On the one hand it may be set in response to an unsuccessful memory access (i.e. where that memory access has not been correctly completed as instructed), but on the other hand may also be set in response to other types of error exception conditions in the apparatus (for example whilst other data processing operations are being carried out), such as due to random events or upsets.

To do this, where the system error results in an error exception condition being set within the apparatus and in response to which the processing circuitry is typically configured to perform an exception handling procedure, the present techniques introduce an error mask condition (which may for example be set by setting an error mask value stored in the apparatus) which enables the processing circuitry to prioritise its response to the system error. In particular, when the system error is notified to the processing circuitry (by the setting of the error exception condition) whilst the processing circuitry is already performing an exception handling procedure in response to a first exception condition, or whilst the processing circuitry is executing pre-defined "critical program code" where it is not possible to respond to the system error by performing an exception handling procedure, the processing circuitry is able to defer its response to this system error by means of the setting of a deferred error exception condition and clearing the error exception condition which has been set as a result of the system error occurring. This not only allows the processing circuitry to continue its exception handling procedure in response to the first exception or critical program code uninterrupted, but also enables the system to better distinguish between the source (i.e. data processing instruction or at least set of data processing instructions) which has resulted in the system error occurrence. In particular, it enables the system to distinguish between a system error source which has resulted from instruction execution which preceded initiation of the exception handling procedure in response to the first exception and instruction execution which formed part of the exception handling procedure for the first exception. This functionality is configurable in the processing circuitry by means of an error memory barrier condition which can be made to exist (be set) by the system programmer. There are various ways in which this error memory barrier condition could be set, for example, by means of a dedicated instruction, by being defined always to exist when the processing circuitry initiates performance of the exception handling procedure, by being defined to exist when the processing circuitry initiates performance of the exception handling procedure if an ongoing "mode" of the apparatus (e.g. defined by a value held for this purpose in the apparatus) is set, and so on. This arrangement advantageously provides an apparatus which is able to more efficiently handle such system errors without the need to for example make use of data and instruction synchronisation barriers at the beginning of the exception handling procedure (routine), which typically have significant processing and time cost associated with them.

In some embodiments the processing circuitry is capable of setting (i.e. is configured to set) the error exception condition in response to an indication received that a memory access has not been successful, but this may not be the only type of event in response to which the processing circuitry is configured to set the error exception condition, and in some embodiments the processing circuitry is configured to set the error exception condition in response to other events than an unsuccessful memory access. For example, the processing circuitry may set the error exception condition in response to an unsuccessful data processing operation, and so on.

The processing circuitry may respond to the error exception condition in a variety of ways, and in some embodiments the processing circuitry, if the error exception condition is set and the error mask condition is not set, is capable of performing an exception handling procedure.

The data processing operations may take a variety of forms, and in some embodiments the data processing operations comprise memory accesses, and the processing circuitry is capable of receiving an error response for a memory access, and wherein the processing circuitry is capable of setting the error exception condition if the error response indicates that the memory access has not been successful.

In some embodiments the processing circuitry is capable of determining that the error memory barrier condition exists in response to an error memory barrier instruction in the data processing instructions. The provision of an error memory barrier instruction provides the system programmer with flexibility in determining when the error memory barrier condition exists (is set) for the processing circuitry, and moreover provides the opportunity for the processing circuitry to have a configuration according to which, when the error memory barrier instruction is encountered, not only to set up the error memory barrier condition, but also to perform other actions.

In some embodiments, the processing circuitry is capable of, as part of the exception handling procedure and if the deferred error exception condition is set, initiating a remedial response with respect to at least one data processing instruction, wherein the at least one data processing instruction comprises a data processing instruction executed prior to determining that the error memory barrier condition existed.

When the processing circuitry has set the deferred error exception condition as part of performing the error memory barrier procedure, it can be inferred that at least one data processing instruction which was executed prior to the determination by the processing circuitry that the error memory barrier condition existed (for example, by execution of a error memory barrier instruction) caused the error response resulting in the deferred error exception condition being set, and an appropriate remedial response can then be taken with respect to that at least one data processing instruction, for example to cause it to be avoided in subsequent execution of the same sequence of data processing instructions again.

In some embodiments the apparatus further comprises error memory barrier mode value storage, wherein when the processing circuitry initiates performance of the exception handling procedure the processing circuitry is capable of determining that the error memory barrier condition exists in dependence on an error memory barrier mode value stored in the error memory barrier mode value storage. For example, the error memory barrier mode value storage may store a single bit which indicates whether the processing circuitry is operating in a mode in which the error memory barrier condition exists or not on taking the exception. This value may define an ongoing mode of the processing circuitry as set up by the system programmer according to which the error memory barrier condition is defined to exist when the processing circuitry initiates performance of the exception handling procedure. The error memory barrier condition may also, in some embodiments, be defined within the apparatus to exist whenever an exception handling procedure is initiated and in these embodiments there is no need for any explicit action (e.g. the execution of an error memory barrier instruction or an error memory barrier mode value being set) in order for the error memory barrier condition to be determined to exist.

In some embodiments, the processing circuitry is capable of when performing the error memory barrier procedure and if the error memory barrier condition exists, waiting for the error response for each memory access which has not yet completed before executing further data processing instructions. By waiting for the error response for each memory access which has not yet completed, which may for example be determined from the content of a load/store unit associated with the processing circuitry, the processing circuitry can avoid the potential for an incomplete memory access to return its error response during the execution of further data processing instructions, if handling that error response could potentially be disruptive, for example whilst midway through the exception handling procedure being performed in response to a prior error exception condition.

The error mask condition may be set in a variety of ways, but in some embodiments the apparatus further comprises error mask value storage, wherein the processing circuitry is capable of determining if the error mask condition is set in dependence on an error mask value stored in the error mask value storage.

In some embodiments, the processing circuitry is capable of setting the error mask value when beginning the exception handling procedure. Depending on the particular configuration of the apparatus and its processing circuitry, it may be beneficial for the error mask condition always to be set when beginning the exception handling procedure, such that if the occurrence of a further system error (e.g. unsuccessful memory access) results in the error exception condition being set, the processing circuitry, when performing the error memory barrier procedure, will respond by deferring its response to this latter system error. How this particular functionality is implemented may for example depend on whether the processing circuitry has plural software execution privilege levels, which may influence the prioritisation of respective exception handling procedures in response to received indications of system errors.

In some embodiments the processing circuitry is capable of clearing the error mask value as part of the exception handling procedure if the deferred error exception condition is not set. Clearing the error mask condition in this manner enables the processing circuitry to directly respond to an error that was pended whilst the error mask value was set or a subsequent error, i.e. such an error can directly generate an exception.

In some embodiments the processing circuitry is capable of setting the error mask value and clearing the error mask value after a predetermined set of data processing instructions have been completed if the deferred error exception condition is not set. This predetermined set of data processing instructions may for example be a "critical" portion of code which must be atomically executed and thus during the execution of which system errors cannot be responded to by performing an exception handling procedure. Before such a critical portion of code is executed, the error mask condition must be set. Once such a critical portion of code has completed, the error mask condition may thus be cleared in this manner, which enables the processing circuitry to directly respond to an error that was pended whilst the error mask value was set or a subsequent error, i.e. such an error can directly generate an exception.

In some embodiments the processing circuitry is capable of performing the exception handling procedure at a current exception level selected from plural exception levels, wherein the plural exception levels correspond to plural software execution privilege levels. The provision of plural software execution privilege levels within the processing circuitry enables, in the present context, a prioritisation of exception handling procedures to be carried out at different levels of the plural exception levels associated with those plural software execution privilege levels which may for example be used to allow for a later exception handling response (i.e. procedure) to be directly taken (i.e. and not deferred) if the exception level at which it is to be executed corresponds to a higher software execution privilege level than the current exception level.

In some embodiments, the processing circuitry is capable of setting the error mask condition when initiating the (first) exception handling procedure if the (first) exception handling procedure is to be performed by the processing circuitry at an exception level which is the same as or higher than the exception level at which a further exception handling procedure in response to a further error exception condition is to be performed. Accordingly, the setting of the error mask condition can be used to ensure that the (first) exception handling procedure being performed at a higher exception level (software execution privilege level) will not be disturbed by any subsequent setting of the error exception condition (for example the notification of an error response to the processing circuitry) to be handled at the same or a lower exception level. Thus, at a given exception level, software can decide which are the "critical regions" of code which require protection, and this technique can thus be used to implement that protection.

In some embodiments, the processing circuitry is capable of not setting the error mask condition when initiating the first exception handling procedure if the (first) exception handling procedure is to be performed by the processing circuitry at an exception level which is lower than the exception level at which a further exception handling procedure in response to a further error exception condition is to be performed. By not setting the error mask condition in this manner, it can be ensured that, when the processing circuitry is performing an exception handling procedure at its lower software execution privilege level, the exception handling procedure in response to a subsequent setting of the error exception condition will be directly carried out (i.e. an exception will be generated).

In some embodiments the apparatus is capable of providing a virtualized operating environment in which at least one virtual machine operates, wherein the virtual machine is capable of performing the data processing operations in response to the data processing instructions by interaction with the processing circuitry. Accordingly data processing instructions executed by the apparatus may interact with a virtual machine program which models their interaction with the virtual machine hardware.

In some embodiments the apparatus is capable of setting a virtual error exception condition and wherein the processing circuitry, if the virtual error exception condition is set and a virtual error mask condition is not set, is capable of performing the exception handling procedure. Setting the virtual error exception condition may take place in a variety of ways, in some embodiments being set by the hardware and in some embodiments the apparatus is capable of running a hypervisor which controls operation of the virtualized operating environment, and the hypervisor can set the virtual error exception condition. This enables the hardware or hypervisor to "inject" virtual system errors into the system, and these virtual errors may be used for a variety of purposes. The fact that the processing circuitry can then respond to a virtual error by performing the exception handling procedure the same manner as it would respond to a physical error is advantageous, because the nature of the error is then transparent to the guest (i.e. the virtual machine operating under control of the hypervisor).

In some embodiments the error memory barrier procedure further comprises, if the virtual error exception condition is set and if the virtual error mask condition is set: setting a virtual deferred error exception condition; and clearing the virtual error exception condition. This arrangement provides further support for the present techniques within a virtualized operating environment. For example, where the error memory barrier condition is set by the execution of an error memory barrier instruction, this avoids having to trap and emulate the error memory barrier instruction in the hypervisor, which would be costly to do on every exception entry.

In some embodiments the apparatus is capable of providing a value of the virtual deferred error exception condition in place of a value of the deferred error exception condition, when the processing circuitry seeks to determine if the deferred error exception condition is set. The provision of this value may take place in a variety of ways, in some embodiments it being provided by the hardware and in some embodiments a hypervisor provides this value. Accordingly, the hardware or hypervisor can thus maintain a value of the virtual deferred error exception condition (with the above-described advantages), but can also keep this (virtual) distinction between the virtual deferred error exception condition and the deferred error exception condition entirely hidden from the processing circuitry (i.e. from the guest virtual machine).

FIG. 1 schematically illustrates a data processing apparatus 2 comprising processing circuitry 4, an instruction decoder 6, a bank of registers 8 and a memory system 10. The memory system 10 includes one or more cache or memory devices. The processing circuitry 4 includes a number of processing elements such as adders 12, multipliers 14 and shifters 16. When processing data, the instruction decoder 6 is responsive to program instructions to generate control signals for controlling the processing circuitry 4 to process data stored in the registers 8 and to store processing results hack to the registers 8. Under control of the instruction decoder 6 the data processing apparatus 2 may also be controlled to transfer data between the registers 8 and the memory system 10 (such transfer being an example of a "memory access" as referred to herein).

While in the example of FIG. 1, the processing circuitry 4 is illustrated as processing data stored in the registers 8 and storing the results of the data processing back to the registers 8, it will be appreciated that any other kind of storage location may be used instead of the registers 8. It will be appreciated that the data processing apparatus 2 and specifically the processing circuitry 4 may typically include other elements not illustrated in FIG. 1.

Figure 2:
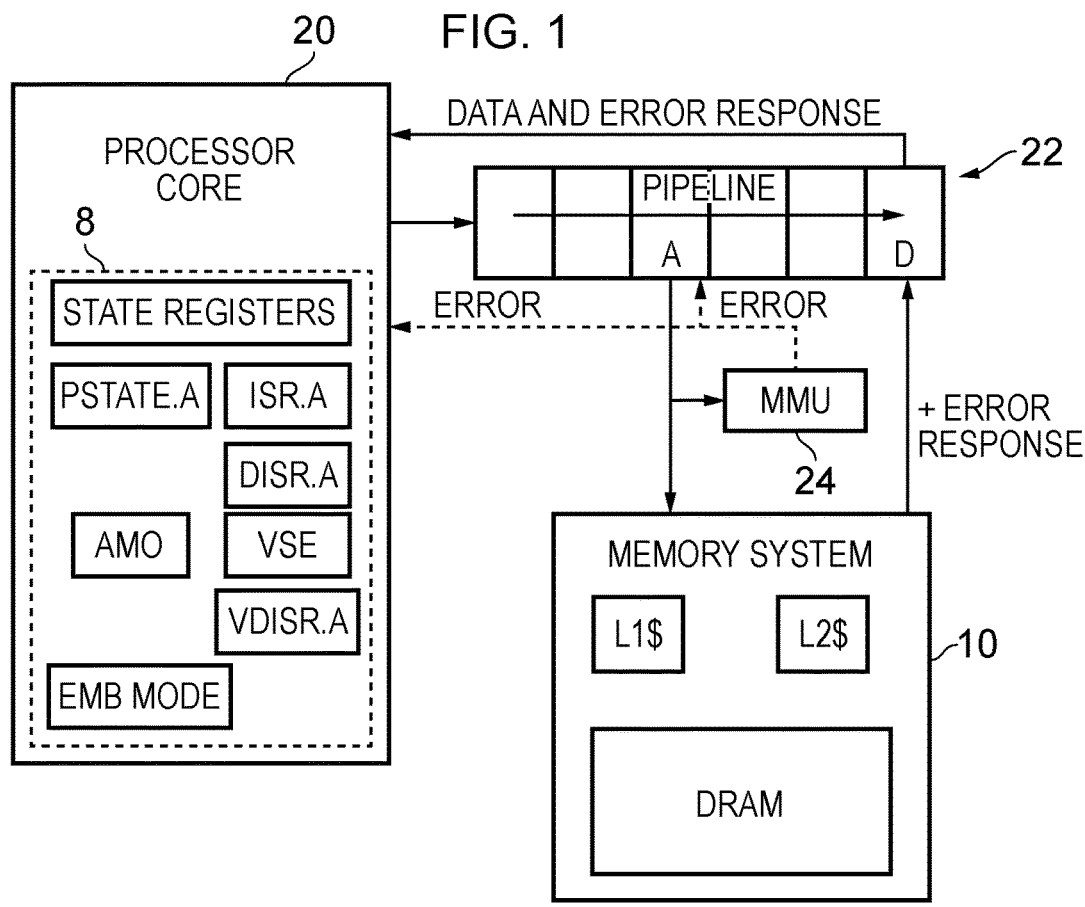
FIG. 2 schematically illustrates in more detail the configuration of some components of FIG. 1 in one embodiment.

FIG. 2 shows more detail of some components of the data processing apparatus 2 of FIG. 1. A processor core 20, load/store unit 22, memory management unit (MMU) 24 and memory system 10 are shown. The processor core 20 (which with reference to FIG. 1 includes the processing circuitry 4, the decoder 6 and the registers 8, although for clarity of illustration only the registers 8 are illustrated in FIG. 2). The processor core 20 (and specifically the processing circuitry therein) makes use of the pipelined load/store unit 22 to handle memory access requests which it issues in response to corresponding data processing instructions. Due to the latency associated with such memory accesses, the load/store unit 22 administers the interaction with the memory system, and later provides the response to the processor core 20, whilst the processor core 20 can in the interim continue with other data processing instruction execution. For example, as illustrated, the processor core 20 may provide the load/store unit 22 with the memory address (A) to which it seeks access (e.g. a load from that memory location). Instructions move from left to right as illustrated and thus the memory address (A) goes out on one cycle and the data (D) is returned later (thus resulting in the above mentioned asynchrony).

The memory system 10 is shown in FIG. 2 to comprise an L1 cache (L1$), an L2 cache (L2$) and a main DRAM memory. The memory system 10 may also have an associated MMU 24 to administer certain aspects of the interaction between the processor core 20 and the memory system 10, for example to provide address translations between virtual addresses used by the processor core 20 and physical addresses used within the memory system 10, and so on. A memory access issued by the load/store unit 22 to the memory system 10 can be received by the MMU 24 and this may already result in an error being returned to the load/store unit 22 (and possibly directly to the processor core 20 as shown by the dashed path) if the access request is identified by the MMU 24 as not being able to be successfully carried out, for example because the permissions stored in a page table within the MMU 24 do not allow this particular memory access. A memory access request which does reach the storage locations within the memory system 10 results in an error response being returned to the load/store unit 22 and, if successful (and so defined by the memory access), is accompanied by data retrieved from the corresponding memory location (address). It should therefore be appreciated that the term "error response" as used here does not imply that an error has necessarily occurred, but rather whether an error has occurred can be determined from the content of the error response which is always received. This data and error response can then be passed from the load/store unit 22 to the processor core 20, as is shown in FIG. 2 for the example data D.

In the present context, the content of the error response is of particular relevance, in particular if this indicates to the processor core 20 that the memory access has not been successful. In this situation the processing circuitry within the processor core 20 will set an error exception condition (by setting the register value ISR.A to 1) in order to trigger a corresponding exception handling procedure. Nevertheless, the processor core 20 may not immediately carry out the exception handling procedure triggered by the setting of the error exception condition, under circumstances which will be discussed in more detail below with respect to the following figures. In order for this functionality to be provided by the processor core 20 it is configured to store various values within the registers 8. Registers 8 in FIG. 2 schematically illustrate various state registers (which configure the current processor state, e.g. a stack pointer, a link register, a program counter, and other general purpose register values) and further registers shown holding the values PSTATE.A, ISR.A, DISR.A, AMO, VSE, VDISR.A and an EMB mode, although it should be noted that the DISR and VDISR registers illustrated holding values labelled by the suffixes ".A" may also hold further related values. For example, whilst DISR.A holds a value indicating whether or not this "deferred error exception condition" has been set, other parts of the DISR register can store further information of use when handling a relevant error exception, such as error syndrome information. This error syndrome information may for example include detail of the type of error and/or detail of the effect of the error on the state of the processor. Usage of these registers and values will be discussed in further detail below.

Figure 3:
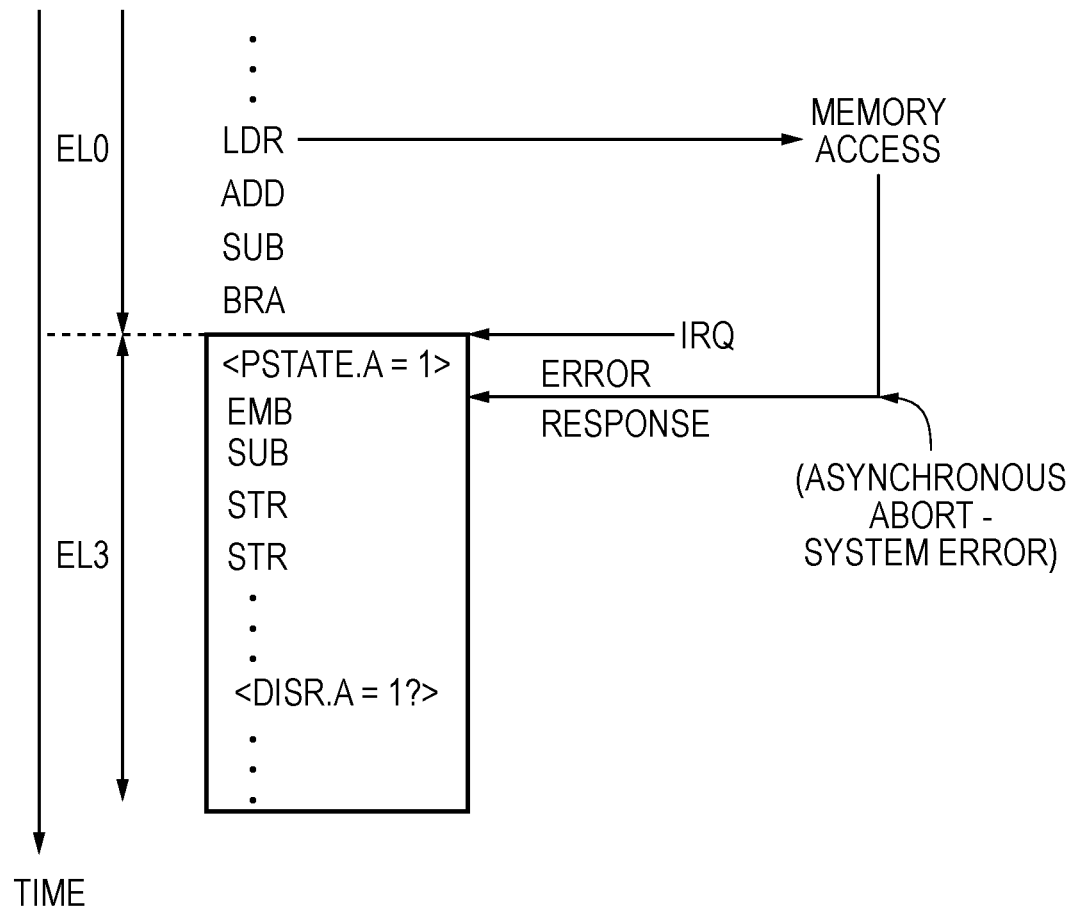
FIG. 3 illustrates a sequence of data processing instructions which may be executed by processing circuitry in one embodiment and some related data processing operations and system events.

FIG. 3 shows an example sequence of data processing instructions which may be executed by the processing circuitry of the system. For the first portion of the data processing instructions the processing circuitry is operating at its lowest exception level (EL0) corresponding to a lowest software execution privilege level. Thereafter, for the data processing instructions labelled as corresponding to the exception handling routine, the data processing circuitry is operating at its highest exception level (EL3) corresponding to a highest software execution privilege level. As can be seen in the figure a load (LDR) instruction executed in the first portion of the data processing instructions results in a memory access, which, in this illustrated example of their execution, ultimately results in an error response which indicates that the respective memory access has not been successfully completed, i.e. a system error results. This response therefore represents an asynchronous abort, wherein the timing of the reception of the abort by the processing circuitry may bear little correlation to when the instruction which initiated the corresponding memory access was executed. For example, based on the example of FIG. 3, the error response resulting from the LDR instruction has been received by the processing circuitry after the IRQ (interrupt request). It was thus the reception of the IRQ which caused a first exception condition to be set (and thus initiation of the exception handling routine) before the error response from the LDR instruction is received, and the processor core 20 is processing the first exception handling routine at the EL3 exception level when the error response from the LDR (executed at the EL0 exception level) is received.

Note that, as indicated at the beginning of the exception handling routine, a first action (carried out by the processing circuitry hardware) is to set the error mask value PSTATE.A to 1, because in this example the first exception handling routine is handled at the highest exception level (EL3), which must therefore be the same as or higher than the exception level at which a further exception handling procedure in response to a further error exception condition is to be performed, and this error mask value indicates that the error mask condition is set. This setting of the error mask condition is made use of according to the present techniques to support a mechanism by which a subsequent error response received by the processing circuitry indicating that a system error has occurred (and thus setting the error exception condition) will not immediately generate a further exception, but rather will be pended (i.e. deferred). This mechanism which will be described further below with reference to the subsequent figures.

In the example shown in FIG. 3, an instruction encountered by the processing circuitry early in the exception handling routine is an EMB (error memory barrier) instruction which is provided by the present techniques. Encountering this EMB instruction causes the processing circuitry to determine that an error memory barrier condition now exists within the apparatus (system). In other embodiments the processing circuitry may determine that the error memory barrier condition exists by default whenever an exception handling routine is initiated (i.e. explicit inclusion of an EMB instruction is not required) or the processing circuitry may determine if the error memory barrier condition exists by reference to an EMB mode value stored in the registers of the processor core (see item 8 in FIG. 2), thus giving the system programmer the flexibility to set this mode according to the particular system requirements. Finally, note that later in the exception handling routine a check is made as to whether DISR.A=1 (a step carried out by software in this embodiment), which enables the apparatus to determine if an error response indicating a system error has been received during the exception handling routine. More detail of this is described below with reference to the subsequent figures.

Figure 4:
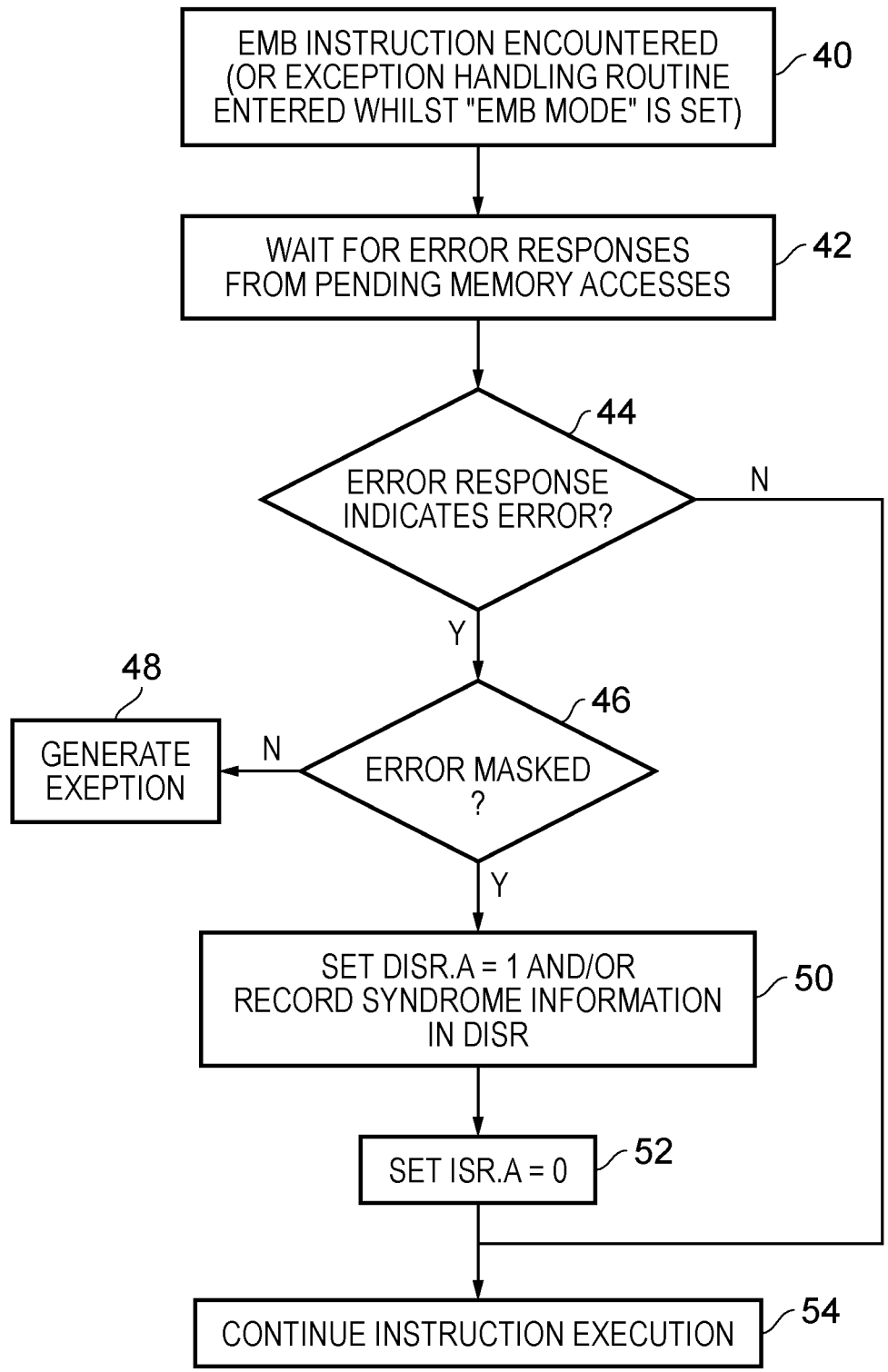
FIG. 4 illustrates an example set of steps which are carried out by the processing circuitry in one embodiment.

FIG. 4 shows a set of steps which are taken by the processing circuitry (i.e. the system hardware) in one embodiment. These steps correspond to actions taken when an EMB instruction is encountered, for example at the beginning of an exception handling routine as illustrated in FIG. 3, or when an exception handling routine is entered (initiated) whilst the EMB mode is set. Encountering the EMB instruction corresponds to the first illustrated step in FIG. 4, namely step 40. In response, the processing circuitry (at step 42) waits for any outstanding errors responses from pending memory accesses, i.e. those memory accesses which have a corresponding entry occupied in the load/store unit 22 shown in FIG. 2, which have not yet completed. It remains possible for a further system error to be notified to the processing circuitry while it is executing the exception handling routine.

At step 44, the processing circuitry determines if a (physical) error response has been received from one of the various pending memory accesses which indicates an error (i.e. that the pending memory access was ultimately unsuccessful). If this is not the case then the flow proceeds directly to step 54, where further instruction execution (initially within the exception handling routine) continues. If, however, an error response does indicate an error at step 44, thus causing the error exception condition to be set (ISR.A=1) by the processing circuitry, then the flow proceeds to step 46, where the processing circuitry determines if this error is masked, by checking if the error mask condition is set.

If the error is not masked then the flow proceeds to step 48 where an exception in response to this error is generated and the usual procedure for handling such exceptions, e.g. branching to another exception handling routine, is carried out. Taking this exception can include writing error syndrome information to an exception syndrome register, and this error syndrome information may include information indicating whether the programmer-visible state of the processor is correct or is in fact infected by the error. Conversely, if it is determined at step 46 that the error is masked, the flow then proceeds to step 50 where the processing circuitry sets the value of DISR.A to 1 and/or records the above-mentioned syndrome information related to the error in other parts of the DISR register. This error syndrome information includes detail of the type of error and/or (as above) detail of the effect of the error on the state of the processor. The error type information may also indicate whether the error is of a type that can be isolated by the error memory barrier. For example, note that (as described above) at step 42 the error memory barrier waits for all memory accesses to complete and return an error status, but if an error arises which has not been provoked by a memory access then the error memory barrier might not "isolate" this error. To address this, when the exception handling procedure records syndrome information for the error, it records whether the error is of a type that can be isolated by the error memory barrier.

Setting DISR.A and/or recording the error syndrome information is referred to herein as a deferred error exception condition being set. Then the flow proceeds to step 52 where the processing circuitry sets the value of ISR.A to 0 (i.e. the error exception condition is cleared). Thereafter, the processing circuitry continues with instruction execution, i.e. In the context of the example shown in FIG. 3 with the subsequent instructions that follow the EMB instruction in the exception handling routine. However, it should be noted that the system programmer has the freedom to add an EMB instruction at any point within the data processing instructions, not necessarily within (or indeed at the beginning of) an exception handling routine, and in such situations the continuation of instruction execution shown at step 54 will be of the instructions which follow EMB instruction wherever that EMB instruction is to be found.

Figure 5:
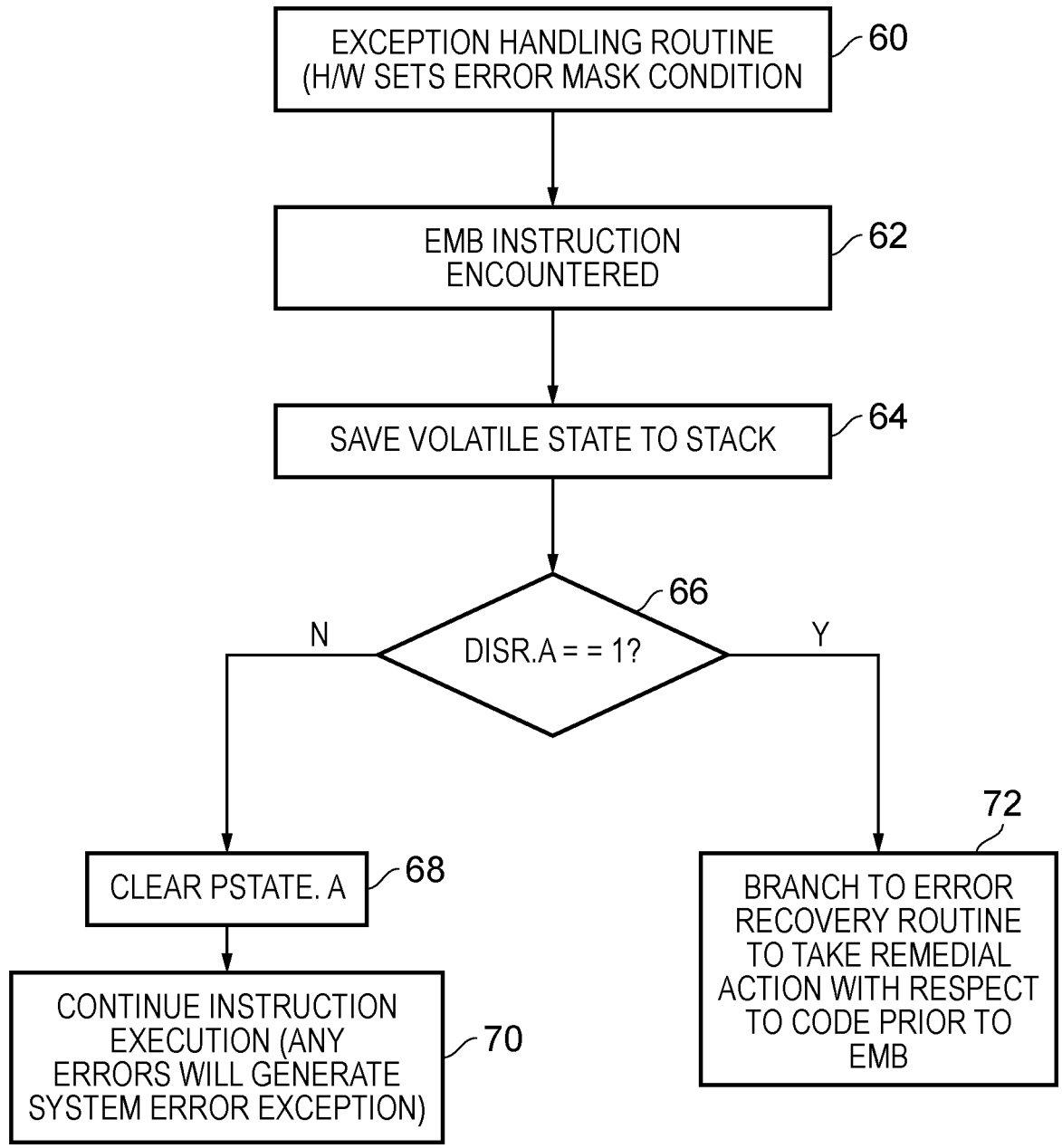
FIG. 5 illustrates a sequence of steps which are carried out in response to data processing instructions by the processing circuitry in one embodiment.

FIG. 5 shows a sequence of steps which are complementary to those shown in FIG. 4, which is carried out by software providing an exception handling routine in one example embodiment. The first step shown in FIG. 5 is the beginning of the exception handling routine (step 60). Note that at this point the hardware sets the mask condition appropriately (for example on the basis of the exception level, as will be described in more detail below). Then, at step 62, an EMB instruction is encountered which sets the error memory barrier condition. Note that in other embodiments, an EMB mode might have been set and the error memory barrier condition is set by the hardware when it initiates the exception handling routine (at step 60), and step 62 can then be skipped. The next step, carried out by software, at step 64, is to save any volatile processor state (to the stack, for example), including the content of the general-purpose registers, the exception syndrome registers and so on. This enables later analysis of the exception, and recovery to the point from where the exception was taken, to occur.

Once the volatile state of the processor has been saved, at step 66 it is then determined if the value of DISR.A is currently 1. If this is not the case then it can be inferred that the instruction execution had reached the point of the EMB operation without a system error having being received by the processing circuitry and at step 68 the software clears (i.e. sets to zero) the value of PSTATE.A, i.e. this error mask value is cleared. The flow then proceeds to step 70 where instruction execution continues and, as mentioned above, any system errors received will generate a system error exception in the usual fashion. It can be inferred that the instruction execution had passed the point of the EMB operation when any such system error was received by the processing circuitry. If, however, at step 66 it is determined that the value of DISR.A is currently 1, it is known that a system error has been received by the processing circuitry and pended (deferred) and the flow proceeds to step 72 where a branch is taken to a dedicated error recovery routine to take remedial action with respect to code (a section of data processing instructions comprising at least one data processing instruction) which preceded the EMB instruction (or at least the point in the instruction execution at which the determination that the error memory barrier condition existed was made). In the example illustrated in FIG. 3, where the EMB instruction is at the beginning of the exception handling routine, this then corresponds to remedial action being taken with respect to code prior to the exception handling routine, i.e. In the sequence of instructions which are shown preceding the exception handling routine.

Figure 6:
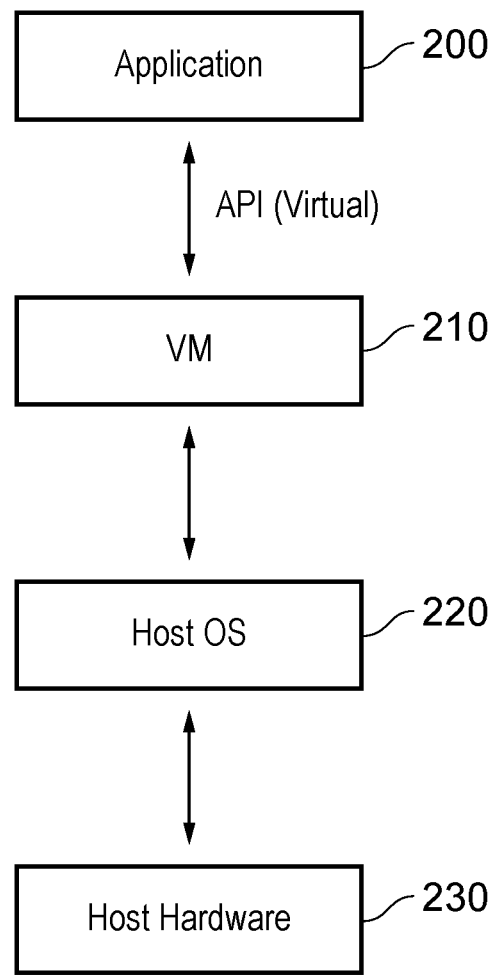
FIG. 6 schematically illustrates the virtualized operating environment of one example embodiment.

FIG. 6 schematically illustrates an embodiment in which a virtualized operating environment is provided. Here, instead of the data processing instructions of an application 200 being executed under control of an operating system which interacts directly with the system hardware, the data processing instructions are executed under control of a guest operating system (virtual machine 210) which indirectly interacts with the system hardware 230 under control of a host operating system 220. A hypervisor running on the host operating system maintains overall control of the virtualized operating environment and dictates what a virtual machine (i.e. guest operating system) can see and interact with in the system. The virtual machine program 210 supports an application program interface (API) to an application program 200 which is the same as the application program interface which would be provided by the real hardware.

It should be noted that some aspects of this "virtual" API are provided by hardware—notably the virtual error condition, the virtual error mask condition, and the VDISR register—in order to accelerate the API. The hypervisor can set the exception level EL2 to be the target exception level for a physical error exception by setting the value AMO to 1. The hypervisor can also create a "virtual error exception condition" within the system. This is done by the hypervisor setting the value of VSE to 1 when the value AMO is set to 1. The target exception level for a virtual error exception is always EL1, i.e. the guest operating system. Therefore this virtual error can be masked by the guest operating system using the PSTATE.A error mask value (as described above). Hence, when the value AMO is set to 1, the PSTATE.A error mask value defines a "virtual error mask condition" at EL1 and a "physical error mask condition" at EL2. Indeed a feature of the guest operating system handling these virtual errors in the same way as physical errors, since the configuration of the guest operating system need not differ for the two types, in effect makes the use of these virtual errors (as opposed to physical errors) transparent to the guest operating system, since they handled in the same way.

Thus the value AMO is used here to control the manner in which the apparatus responds to physical and virtual errors respectively. In this example embodiment setting the value AMO to one defines that all system errors (asynchronous aborts) are taken to EL2 for at least initial handling by the hypervisor. Therefore when at the exception level EL1, the physical error condition would be handled at a "higher" exception level, so the physical error mask condition is not set. AMO=1 also means that virtual errors are handled at the exception level EL1. Therefore when at the exception level EL1, the physical error condition would be handled at a "lower or the same" exception level, so the virtual error mask condition is set.

Figure 7:
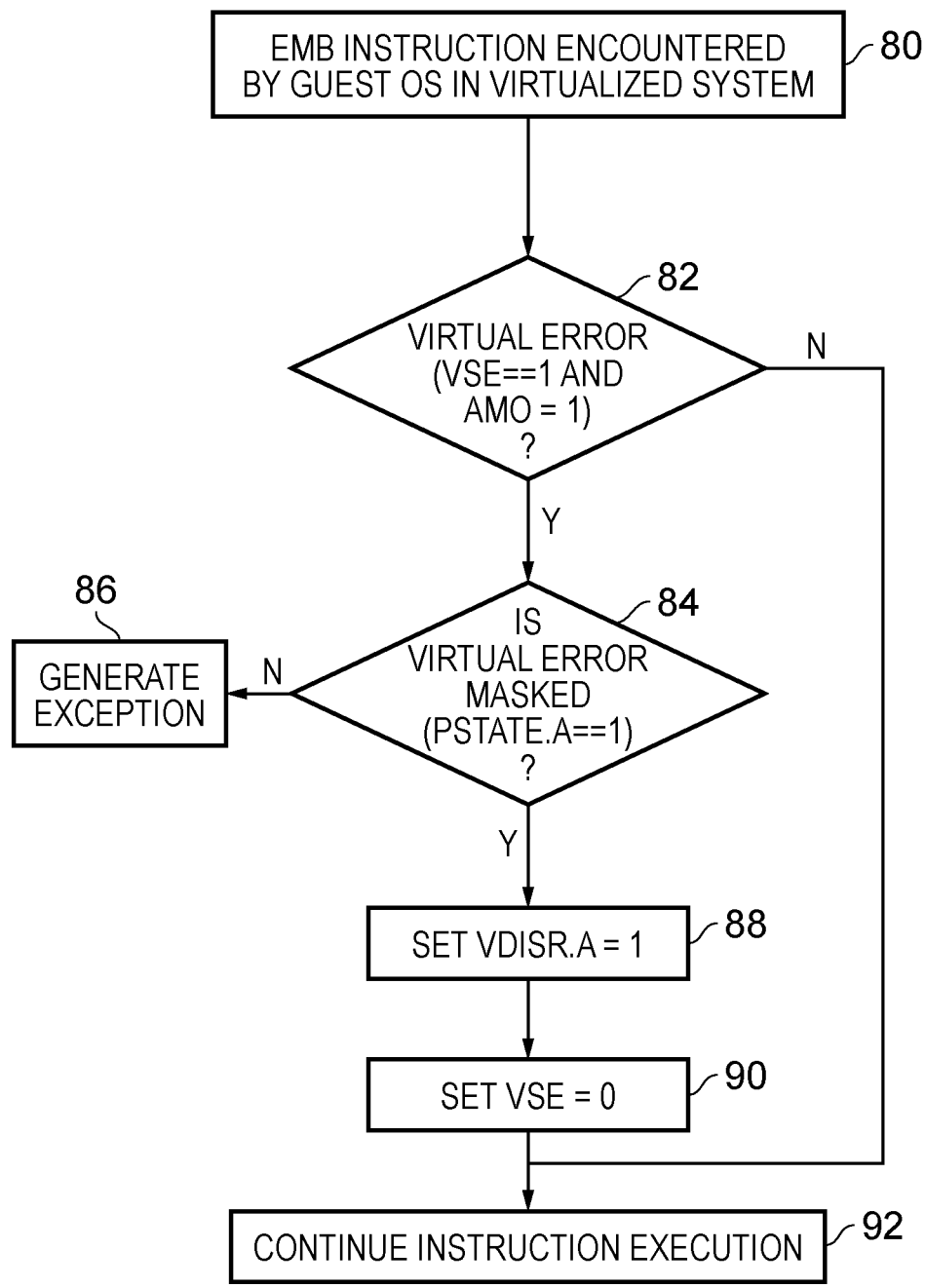
FIG. 7 illustrates a sequence of steps which are carried out in one embodiment running in a virtualized operating environment.

FIG. 7 shows an example sequence of steps which are taken in response to encountering the EMB instruction at the beginning of the EL1 interrupt exception handler in this example embodiment. The first step shown in FIG. 7 represents the point at which the EMB instruction is encountered by the guest operating system in this virtualised system (step 80). Note that this therefore follows step 52 in the example of FIG. 4 and further that, because the AMO bit is set, the physical error mask condition is not set, regardless of the error mask value. Thereafter, in response to the EMB instruction it is determined if a virtual system error is pending (i.e. if VSE=1 and AMO=1). If it is not, then the flow proceeds directly to step 92 where normal instruction execution of data processing instructions following the EMB instruction continues. However, if VSE=1 and AMO=1 then the flow proceeds to step 84 where it is determined if the virtual error mask condition is set, i.e. if PSTATE.A=1 and AMO=1. If it is not, then the flow proceeds to step 86 where a virtual error exception is generated and an appropriate virtual error exception handling routine is then executed in response by the guest operating system at EL1. If, however, this virtual error is determined at step 84 to be masked, then the flow proceeds to steps 88 and 90 where the virtual deferred error exception condition is set (VDISR.A is set to 1) and the virtual system error exception condition indication (VSE) is reset to 0. Further syndrome information may also be recorded in VDISR (as has been described above with reference to DISR), for example include detail of the type of error and/or detail of the effect of the error on the state of the processor.

The flow then proceeds to step 92 for continued instruction execution (i.e. of the instructions which follow the EMB instruction). The steps shown in FIG. 7 thus enable the virtualized system to provide an environment in which virtual system errors, created by the hypervisor running as part of the host OS, can be handled by the guest OS in the same way as physical error by the host OS, in particular the guest OS can mask virtual errors in the same way that the host OS masks physical errors by the setting of the value PSTATE.A. Also, with reference to FIGS. 8A and 8B, note that at a later stage in the EL1 interrupt handler the software checks whether DISR.A is currently set and so on, as was described with reference to FIG. 5, but in this virtualized embodiment with the AMO value set to 1, when the check is made on the value of DISR.A, the hardware intervenes to return the value of VDISR.A.

Figure 8A:
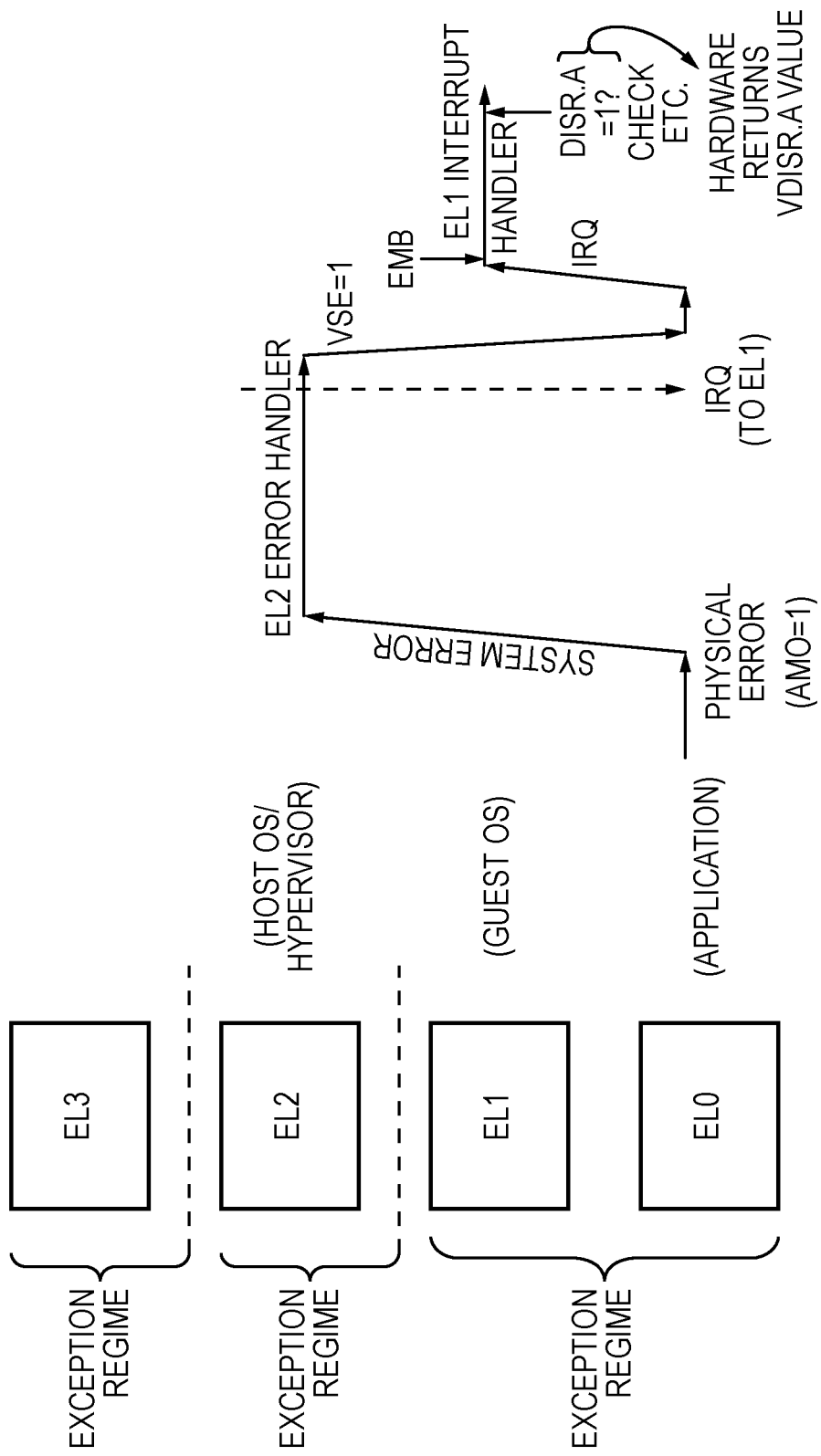
FIGS. 8A and 8B schematically illustrate plural exception regimes and exception levels in embodiments and some example transitions between these exception levels when exceptions are taken.

FIG. 8A corresponds to an example embodiment in which such a virtualized operating environment is provided by the data processing apparatus. In this illustrated example embodiment four exception levels are provided (EL0-EL3) corresponding to three exception regimes (EL0 and EL1 forming one exception regime), wherein a hypervisor which is administering the operation of the virtual machine operates at a higher software execution privilege level than the guest operating system, which it itself operates at a higher software execution privilege level than an application running on that guest operating system. The right hand part of FIG. 8A schematically illustrates the transitions between the exception levels corresponding to an illustrative set of events. The first event illustrated is the reception of a physical (i.e. not virtual) error received by the processing circuitry whilst the application running under the guest operating system is executing at the lowest exception level (EL0). The corresponding physical error exception has a target exception level of EL2, i.e. the physical error exception handler is run by the hypervisor. In this example embodiment, this configuration is arranged by the virtue of the fact that the value AMO is set to one, which defines that all system errors (asynchronous aborts) are taken to EL2 for at least initial handling by the hypervisor.

However, the hypervisor need not fully carry out an error response to the received system error, since it is further configured to be able to delegate exception handling to the guest operating system, which it can do by setting a "virtual error" within the system. This is done by the hypervisor setting the value of VSE to 1 when the value AMO is set to 1. Although this is not an asynchronous event, this virtual error can nevertheless be masked by the guest operating system using the PSTATE.A error mask value (as described above). When the value AMO is set to 1, the PSTATE.A error mask value defines a "virtual error mask condition". Indeed a feature of the guest operating system handling these virtual errors in the same way as physical errors, since the configuration of the guest operating system need not differ for the two types, in effect makes the use of these virtual errors (as opposed to physical errors) transparent to the guest operating system, since they are handled in the same way. More detail of how this transparency is achieved is given below.

Thus, when the hypervisor returns the exception level to EL0 for the application to take over, the target of the virtual error exception will now be EL1, to be handled by the guest operating system. Note however, that whilst the error handler was running under the control of the hypervisor at EL2, an interrupt request (IRQ) was received by the system. Accordingly, once the software execution privilege level returns to EL0 there are then two exceptions pending, one virtual system error (as set up by the hypervisor by the setting of VSE) and the more recently received physical interrupt (the IRQ). The order in which these two pending exceptions are taken can be defined by the system designer in dependence on the particular system requirements (i.e. it is implementation defined). In the example illustrated in FIG. 8A it is the response to the IRQ which is taken first, this having a target of EL1. The interrupt handler (an exception handling routine) carried out at EL1 is then carried out. This exception handling routine begins with an EMB instruction, as shown, and hence the steps carried out by the virtual machine are related to those shown in FIG. 4, with some adaptation for this virtualized embodiment.

Figure 8B:
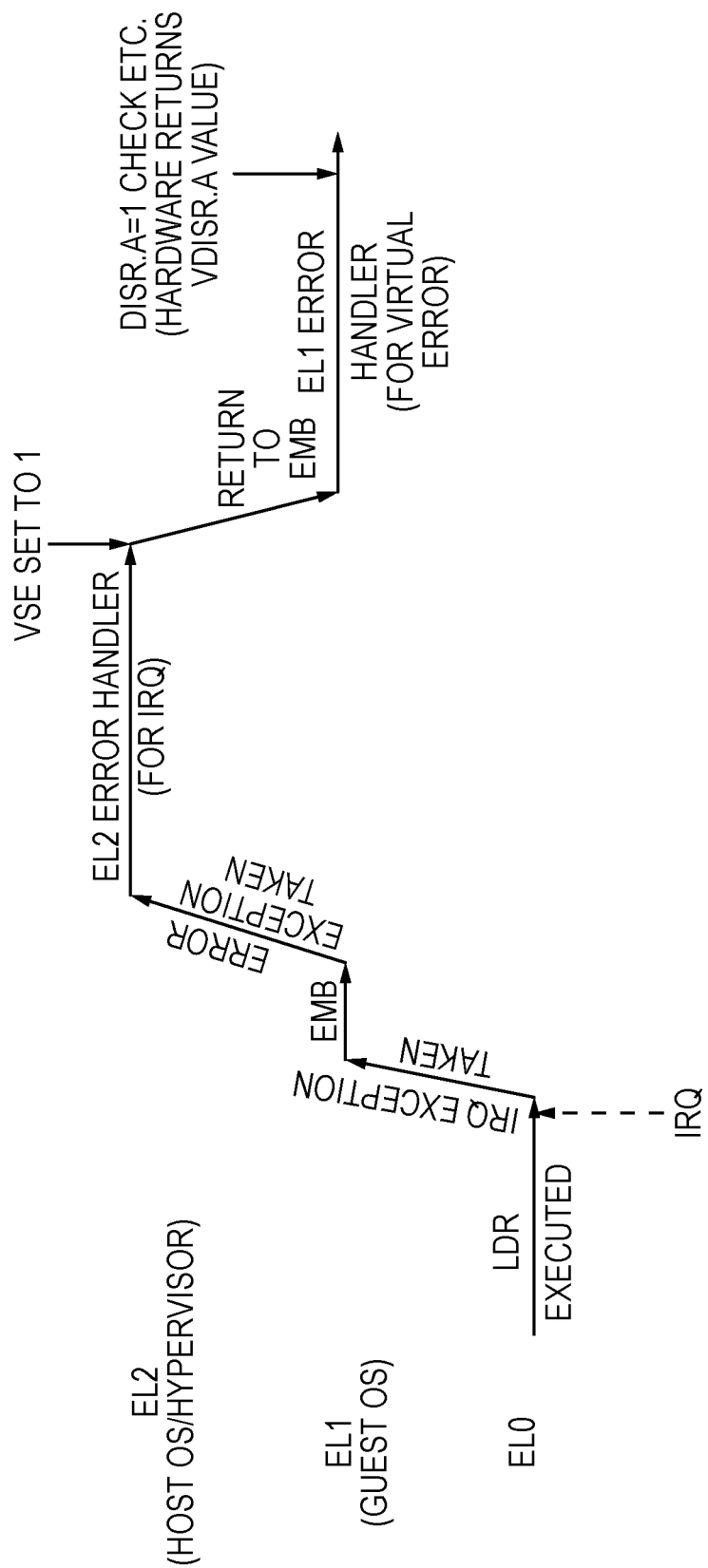

FIG. 8B corresponds to another example embodiment in which such the virtualized operating environment is provided by the data processing apparatus, again with four exception levels although only EL0, EL1 and EL2 are discussed in this example. This corresponds to the example of FIG. 3 (with the difference that here EL2 is the highest exception level reached). The right hand part of FIG. 8B schematically illustrates the transitions between the exception levels corresponding to another illustrative set of events. The first event illustrated is the execution of the LDR instruction at EL0. Before the response to this memory access happens, an IRQ exception is taken to EL1 (i.e. the guest OS). At EL1, an EMB instruction is executed under the control of the guest OS. The EMB operation detects the physical error exception condition and, because (as shown in FIG. 4) the error is not masked (because AMO is set), this generates an error exception immediately. The error exception is taken to EL2 (i.e. the host OS/hypervisor). The host OS/hypervisor triages the error (by the actions of an error handler) and delegates the handling back to EL1 by setting a "virtual error" by setting VSE=1. Instruction execution returns to re-execute the EMB instruction.

At this point, the physical error (IRQ) has been dealt with, so now the EMB processes the virtual error. The virtual error is masked by PSTATE.A, so VDISR.A gets set as described above. Thus the delegated virtual error is deferred by the EMB instruction. Note that in the example of FIG. 8B (as opposed to the example of FIG. 8A) there is no (arbitrary) choice of prioritizing the IRQ over the pending virtual error on return to EL0, and moreover it shows how in the virtual case the EMB instruction barriers both the virtual and physical errors.

FIG. 9A shows a table giving the correspondence between a current exception level and a target exception level in an example embodiment providing a virtualised system (in one example). These show how a physical error exception condition is handled in each of these situations, i.e. it may (P) always be pended i.e. automatically treated as masked, it may be (M) pended if PSTATE.A is set (i.e. physical system error is masked) or taken otherwise, or it may be (T) always taken (i.e. not subject to masking by PSTATE.A). FIG. 9B shows the corresponding table for a virtual system error, which as shown will always have a target exception level of EL1 (i.e. to be handled by the guest operating system), regardless of the current exception level when the virtual system error is encountered (i.e. set by the hypervisor). FIG. 9C shows a table giving the usage of the AMO and VSE values by the hypervisor in a virtualised system in order to define the target for a physical system error.

FIG. 10A shows an example set of pseudocode defining the configuration of an error memory barrier instruction in one example embodiment. In the pseudocode of FIG. 10A, the following functions and abbreviations are used:

HaveEL (exception level)—returns true if this exception level exists;

SCR_EL3.EA—is set to define the target for a system error (asynchronous abort) to be exception level EL3;

IsSecure( )—returns true if currently operating in a secure state (for example as provided by the TrustZone technology provided by ARM Limited Cambridge, UK);

PSTATE.EL—defines the current exception level;

HCR_EL2.TGE—is set to define that all exceptions are to be handled at EL2 as opposed to EL1);

HCR_EL2.AMO—the AMO value referred to above defined for execution level EL2;

DISR_EL1.A—records the deferred error exception condition at exception level EL1;

ISR_EL1.A—records the error exception condition;

HCR_EL2.VSE—the VSE value referred to above set at exception level EL2;

VDISR_EL2.A—the VDISR value referred to above.

Note therefore that the pseudocode example shown in FIG. 10A extends the principle shown in FIG. 9C to EL3, with the use of the SCR_EL3.EA bit. The value of this bit sets the target exception level for a physical error exception to be EL3 and has priority over HCR_EL2.AMO. Note however that there is no further "virtual error" condition in this example embodiment i.e. no "SCR_EL3.VSE" bit.

FIG. 10B shows an example sequence of instructions for exception entry, where the exception hander wishes to isolate errors to the caller. Note the usage of the EMB instruction at the start of this sequence and the MRS/TBNZ pair at the end of the sequence shown (corresponding to steps 66 and 72 in FIG. 5). Note that MRS ("Move to Register from System-register") is used to read the value of, for example, DISR, STP ("Store Pair") is used to store a pair of registers to memory, and TBNZ ("Test and Branch if Non-Zero") is used to test a bit in a register and branches if the value is non-zero.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus for data processing comprising:
   processing circuitry configured to execute at a current exception level selected from plural exception levels, wherein the plural exception levels correspond to plural software execution privilege levels, and to perform data processing operations in response to data processing instructions,
   wherein:
      the processing circuitry is configured to set an error exception condition in a first register location upon detection that a data processing operation has not been successful and, if the error exception condition is set and an error mask condition is not set, to perform an exception handling procedure at a target exception level selected from the plural exception levels;
      the processing circuitry is configured to determine if an error memory barrier condition exists in response to an error memory barrier instruction in the data processing instructions, and to perform an error memory barrier procedure in dependence on the current exception level, the target exception level and whether the error memory barrier condition exists;
      the apparatus is configured to provide a virtualized operating environment in which at least one virtual machine operates at a first exception level under the control of a hypervisor operating at a second exception level, wherein the second exception level corresponds to a higher software execution privilege level than the first exception level, and the at least one virtual machine is configured to perform the data processing operations in response to the data processing instructions by interaction with the processing circuitry;
      the apparatus is configured to set a virtual error exception condition; and
      the error memory barrier procedure comprises:
         (a) if the error exception condition is set and if an error mask condition is set:
            setting a deferred error exception condition in a second register location; and
            clearing the error exception condition in the first register location; and
         (b) if the virtual error exception condition is set and a virtual error mask condition is set:
            setting a virtual deferred error exception condition; and
            clearing the virtual error exception condition.

2. The apparatus as claimed in claim 1, wherein the data processing operations comprise memory accesses, and
   wherein the processing circuitry is configured to receive an error response for a memory access, and wherein the processing circuitry is configured to set the error exception condition if the error response indicates that the memory access has not been successful.

3. The apparatus as claimed in claim 1, wherein the processing circuitry is configured to, as part of the exception handling procedure and if the deferred error exception condition is set, initiate a remedial response with respect to at least one data processing instruction, wherein the at least one data processing instruction comprises a data processing instruction executed prior to determining that the error memory barrier condition existed.

4. The apparatus as claimed in claim 1, further comprising error memory barrier mode value storage, wherein when the processing circuitry initiates performance of the exception handling procedure the processing circuitry is configured to determine that the error memory barrier condition exists in dependence on an error memory barrier mode value stored in the error memory barrier mode value storage.

5. The apparatus as claimed in claim 1, wherein the processing circuitry is configured to, when performing the error memory barrier procedure and if the error memory barrier condition exists, wait for an error response for each memory access which has not yet completed before executing further data processing instructions.

6. The apparatus as claimed in claim 1, further comprising error mask value storage, wherein the processing circuitry is configured to determine if the error mask condition or the virtual error mask is set in dependence on an error mask value stored in the error mask value storage.

7. The apparatus as claimed in claim 1, wherein the processing circuitry is configured to set the error mask condition when beginning the exception handling procedure.

8. The apparatus as claimed in claim 1, wherein the processing circuitry is configured to clear the error mask condition as part of the exception handling procedure if the deferred error exception condition is not set.

9. The apparatus as claimed in claim 1, wherein the processing circuitry is configured to set the error mask condition and clearing the error mask condition after a predetermined set of data processing instructions have been completed if the deferred error exception condition is not set.

10. The apparatus as claimed in claim 1, wherein the processing circuitry is configured to set the error mask condition when initiating the exception handling procedure if the exception handling procedure is to be performed by the processing circuitry at an exception level which is the same as or higher than the exception level at which a further exception handling procedure in response to a further error exception condition is to be performed.

11. The apparatus as claimed in claim 1, wherein the processing circuitry is configured to not set the error mask condition when initiating the exception handling procedure if the exception handling procedure is to be performed by the processing circuitry at an exception level which is lower than the exception level at which a further exception handling procedure in response to a further error exception condition is to be performed.

12. The apparatus as claimed in claim 1, wherein the apparatus is capable of setting a virtual error exception condition and wherein the processing circuitry, if the virtual error exception condition is set and a virtual error mask condition is not set, is configured to perform the exception handling procedure.

13. The apparatus as claimed in claim 1, wherein the apparatus is configured to provide a value of the virtual deferred error exception condition in place of a value of the deferred error exception condition, when the processing circuitry seeks to determine if the deferred error exception condition is set.

14. A method of data processing comprising the steps of:
performing, using processing circuitry executing at a current exception level selected from plural exception levels, wherein the plural exception levels correspond to plural software execution privilege levels, data processing operations in response to data processing instructions;
setting an error exception condition in a first register location upon detection that a data processing operation has not been successful;
performing, if the error exception condition is set and an error mask condition is not set, an exception handling procedure at a target exception level selected from the plural exception levels;
determining that an error memory barrier condition exists in response to an error memory barrier instruction in the data processing instructions;
performing an error memory barrier procedure in dependence on the current exception level, the target exception level and whether the error memory barrier condition exists; and
providing a virtualized operating environment in which at least one virtual machine operates at a first exception level under the control of a hypervisor operating at a second exception level, wherein the second exception level corresponds to a higher software execution privilege level than the first exception level, and the at least one virtual machine is configured to perform the data processing operations in response to the data processing instructions by interaction with the processing circuitry,
wherein the error memory barrier procedure comprises:
(a) if the error exception condition is set and if an error mask condition is set:
setting a deferred error exception condition in a second register location; and
clearing the error exception condition in the first register location; and
(b) if a virtual error exception condition is set and a virtual error mask condition is set:
setting a virtual deferred error exception condition; and
clearing the virtual error exception condition.

15. The apparatus as claimed in claim 1, wherein processing circuitry is configured to set the virtual error exception condition under control of the hypervisor.

16. The apparatus of claim 15, wherein:
if the error exception condition is set and an error mask condition is not set, the processing circuitry is configured to perform the exception handling procedure under control of the hypervisor; and
if the virtual error exception condition is set and a virtual error mask condition is not set, the processing circuitry is configured to perform the exception handling procedure under control of the virtual machine.

17. The apparatus as claimed in claim 16, wherein the hypervisor is configured to control the processing circuitry to set the virtual error exception condition to delegate exception handling to the virtual machine.

18. The apparatus as claimed in claim 1, wherein:
the processing circuitry is configured to set a control value in a third register; and
the target exception level is dependent on the control value.

19. The apparatus as claimed in claim 18, further comprising error mask value storage, wherein the processing circuitry is configured to interpret on an error mask value stored in the error mask value storage as either the error mask condition or the virtual error mask condition, dependent on the control value stored in the third register.

20. The apparatus as claimed in claim 18, wherein the processing circuitry is configured to determine that the virtual error exception condition is set when the control value stored in the third register and a virtual error exception indication stored in a fourth register meet a predetermined condition.

\* \* \* \* \*